United States Patent Office 2,768,996
Patented Oct. 30, 1956

2,768,996

METHOD OF MAKING METALLIC SOAPS

Jack J. Bulloff, Dayton, Ohio, assignor to The Commonwealth Engineering Company of Ohio, Dayton, Ohio, a corporation of Ohio No Drawing. Application November 12, 1954,
Serial No. 468,579

20 Claims. (Cl. 260—105)

This invention relates to a new and improved method for the manufacture of metallic soaps. More particularly, the invention relates to the production of aluminum soaps.

The term "metallic soaps" is used commercially for the water-insoluble or only partially water-soluble soaps obtained by reaction of the fatty acids with metals other than the alkali or alkaline earth metals.

Heretofore, no simple method has been available for predetermining the composition of a metallic soap and reliably reproducing it without accidents resulting in differences from batch to batch. The known commercially practiced method of making these soaps may result in a uniform composition if multiple factors are rigorously controlled. However, with respect to aluminum soaps it is well known in the industry that "Monday soaps" may be higher gelling than "weekday soaps," that "fast strike" soaps are finer than "slow strike" soaps, and that "past-end-point" soaps are less easily washed or powdered than "short strike" soaps. Composition being similar, the physical state of a metallic soap seriously influences its handling and performance properties. Particle size and surface condition are also important factors and should not vary from batch to batch. Since variations do occur when the soaps are made by the known methods, uniformity has been approximated only by painstaking batch control or by blending finished stocks after conventional testing. There are a variety of reasons why the production of the metallic soaps of predictable composition and in a reproducible fashion has not been achieved. In the first place, when manufacture of the metallic soaps began, the technique of sodium soap-making was adopted and this does not lend itself to the production of uniform metallic soaps. Secondly, the fatty materials of the ordinary water-soluble soaps, which are mixtures to begin with, were used. Also, until the discovery that gasoline can be gelled satisfactorily by means of the metallic soaps to produce the product known as napalm, users of the aluminum soaps were not critical of product specifications since even poor samples of aluminum soaps are superior to other metallic soaps, for the various purposes for which they are used. Finally, and most important, so little was known about the constitution of the metallic soaps that no adequate correlation of their composition to use had been established.

Aluminum normally forms such compounds as aluminum chloride ($AlCl_3$) or aluminum bromide ($AlBr_3$), i. e., compounds in which three groups are held by or bonded to the metal atom. Therefore, it could have been expected that reaction between aluminum and an organic acid, HR, would result in the product $AlR_3$, R being the radical derived from the acid. Such is not the case and every attempt to form a product of formula $AlR_3$, by aqueous reaction between aluminum and organic acids has resulted in mixtures containing some of the free acid (which may be designated HR), which mixtures do not contain products in which three of the groups R are always bonded to one Al atom. Rather, the mixtures contain products in which, in the formula $Al(OH)_{3-x}R_x$, $x$ has varied from one to three. This condition has led to the development of various theoretical explanations of the nature of the aluminum soaps. One theory that has been put forward is that the aluminum soaps are mixtures of hydrolyzed or "water-decomposed" materials, the water being said to decompose the product to form free fatty acid (HR), and the hydrolyzed or decomposed materials $AlOHR_2$ (di-soap) and $Al(OH)_2R$ (mono-soap). It is known that the commercial soaps that are designated "di-soap" and "mono-soap" respectively, do not conform at all closely to the formulae assigned to them in accordance with this theory of hydrolysis.

Another theory that has been propounded is based on the colloidal nature of aluminum soap dispersions in organic fluids and is to the effect that aluminum soaps are either complicated polymers or complex decomposition products of the empirical formula $Al(OH)_{3-n}R_n$.

Before the problem of providing a simple method for predicting or predetermining the composition of a metallic soap, and reliably reproducing it as a uniform or homogeneous product could be solved, it was deemed important to evaluate the theoretical explanations of the nature of the soaps that had been advanced and to determine, if possible, the true nature of the metallic soaps.

Careful study has established that, actually, there is only one aluminum soap type and that it is a di-soap of formula $AlOHR_2$. Investigations show that when there are more than two groups R per atom of aluminum, some free acid (HR) is present. Thus, the "tri-soap" of commerce is actually $AlOHR_2 + HR$. I have proved that when the product comprises less than two R groups per atom of aluminum, Gibbsite (gamma aluminum hydroxide) is present and the soap, known commercially as the mono-soap, is actually an equimolecular mixture of $AlOHR_2$ and $Al(OH)_3$.

The other method in common use, the precipitation method, involves the addition of a solution of a selected metal salt to a solution of ordinary or sodium soap. Most aluminum soaps are thus prepared, the aluminum chloride or sulfate solution being run into a rapidly stirred solution of a sodium soap containing the desired fatty acid radical. Potassium soaps may also be employed.

When the di-soaps ($AlOHR_2$) are made by these methods, part of the soap is formed basically and contains aluminum hydroxide [$Al(OH)_3$], and part is formed acidically and contains the free acid (HR). No matter how thorough and careful the subsequent mixing or blending to obtain uniformity is carried out, the hydroxide and acid do not react in aqueous medium to form the desired di-soap, $AlOHR_2$, and therefore the di-soap of commerce is generally a mixture of $xAl(OH)_3$, $1-xAlOHR_2$ and $2xHR$, where $2xH_2O$ has unavoidably entered into the composition of the soap.

Since this invention is concerned with a new precipitation method for making the metallic soaps, the known precipitation method in which the solution of the aluminum soap is added to the sodium salt solution has been given particular consideration. I have determined why it is not possible, except under the most rigid, industrially impractical, conditions to obtain, reproducibly, a substantially pure di-soap of predetermined characteristics by the known precipitation method in which the aluminum salt solution is added to the sodium soap solution. The explanation lies in the fact that when addition of the aluminum salt solution to the strongly alkaline sodium salt solution is commenced, colloidal aluminum hydroxide is formed initially, as the addition of the aluminum salt solution progresses the di-soap $AlOHR_2$ is precipitated (with conversion of a smaller or greater proportion of the hydroxide to di-soap depending on the relative solubility of the di-soap as determined by the nature of the R group present), and as the addition of the aluminum salt solution nears the end-point all of the colloids suspended in the solution flocculate in a dramatic "strike" and, being lighter than the reaction solution, the entire soap product abruptly rises to the top of the reaction vessel in the form of a curd made up of the products precipitated at different stages of the addition of the aluminum salt solution and which are of different composition.

In practice, using this known precipitation method, the di-soap $AlOHR_2$ is obtained only when rigid control of the process is maintained and the acid HR is a solid fatty acid. When liquid or branched-chain acids are used with 50% excess alkali the R/Al ratio varies from 1.7 to 1.9, depending on the acid, the reaction temperature, the rate at which the aluminum salt solution is added to the sodium salt solution, and so on. For each lower or branched-chain fatty acid, a different percentage of excess alkali is required in the sodium salt solution to yield an apparent di-soap, and this excess alkali requirement must be determined empirically for each exact set of operating conditions, even the use of a new pump, a charged vat, or of a soap solution varying slightly in composition tending to alter the composition of the soap.

It will be apparent from the foregoing explanatory discussion that, although metallic soaps are available and used for many purposes, considerable confusion and misleading theories have existed as to their precise nature and their reliable production as materials of predictable composition has not been achieved by any method readily adapted to factory use by unskilled operators.

An object of this invention is to provide a new method for producing metallic soaps the composition of which is predictable and reproducible at will.

Another object is to provide a method for the rapid, economical production of uniform metallic soaps.

A further object is to provide a method for producing di-soap involving the use of an aqueous sodium soap solution and which is uniform and reproducible regardless of the incidental alkalinity of the sodium soap solution.

Briefly, in accordance with this invention, the uniform, readily reproducible metallic soaps are obtained by a method involving the use of an aqueous sodium salt solution and an aqueous aluminum salt solution and in which the sodium salt solution is added to a slight (2–10%) stoichiometric excess of the aluminum salt solution, said excess being sufficient to keep the pH sufficiently low to prevent precipitation of $Al(OH)_3$.

This new method constitutes a direct reversal of the known and commonly used precipitation method, wherein aluminum salt solution is added to the soap solution, and most of the soap formation takes place in alkaline solution which permits the formation of $Al(OH)_3$. The essence of this invention resides in the unexpected discovery that the manner in which the two solutions are brought together determines the uniformity or non-uniformity of the soap formed, and more especially, leads to a predictable stoichiometric product.

I find that when the sodium soap solution is added to the aluminum salt solution, there is an instant "strike" when the addition is started, with immediate precipitation of the di-soap, which continues to precipitate as addition of the sodium soap solution progresses. The precipitated aluminum soap being far more insoluble in acid media than the hydroxide is only very slowly altered by changes in the solution and since the product precipitated is of the same composition from the beginning to the end-point of the sodium salt addition, and the precipitation occurs homogeneously from a minimally supersaturated solute, without the possibility of batch accidents tending to induce variations, the composition of the final soap is essentially uniform. It is also stoichimetric in that large excesses of alkali above 50% do not appreciably alter the fatty acid anion/aluminum cation ratio in the product soap.

The aluminum soaps of the invention have the formula $AlOHR_2$, in which R represents the anion radical of the acid HR, which may be any organic acid capable of forming an aluminum soap. The organic acid HR may be written as—

$$HC_nH_{2(n-p)-1}O_2$$

in which $n$ is the number of carbon atoms present in one molecule of the acid, and $p$ is the number of electron pairs contributed by those atoms (a) forming unsaturated linkages between themselves or (b) forming themselves into rings. Experimentally, the values for $n$ and $p$ can be assigned by determining the "acid" and the "iodine #" for the particular acid and solving equations for $n$ and $p$ therefrom.

In many instances, in industrial practice, the fatty acid is actually a complex mixture of such acids and of some non-saponifiable material which latter must be allowed for in making up the starting batches and in determining $n$ and $p$ to characterize R for the purpose of determining the value $f$ used herein to designate the fatty acid anion-aluminum cation ratio of the product soap. In mixtures, the atomic parameters are not necessarily integers. Thus, for an equimolecular mixture of stearic, oleic, linoleic, linolenic and palmitic acids the value of $n$ is 17.6 and that of $p$ is 1.2. Moreover, the acids which may be used are not limited to those containing only carbon, hydrogen and oxygen, as will be apparent from the examples given herein. A specific instance is the laurylsarcosinates which contain nitrogen. In general, the acids used in practicing the method of the invention may include modified fatty acids containing halogen, sulfur, phosphorus and various substituted functional groups such as hydroxyl groups, keto groups and others so long as the capacity of the acid to form an aluminum soap is not impaired. Surprisingly, acids the sodium salts of which are not sodium soaps, such as butyric and valeric acids, do form aluminum soaps by the present method.

Specifically, the method of the invention is applicable to the production of (a) aluminum soaps of formula $AlOHR_2$, in which R is derived from an organic acid containing four to more carbon atoms, either straight or branched chain, or unsaturated, for example to soaps obtained using such normally liquid acid salts of the metal as the butyrate, caproate, caprylate, 2-ethylhexanoate or 3-ethylheptanoate and (b) those soaps in which R is derived from a normally solid saturated aliphatic acid of high carbon content, e. g., those made using salts of sodium such as the laurate, palmitate, stearate and behenate. The soaps of type (a) are characterized in that they are not hydrolyzed in weakly acid, weakly alkaline or neutral solutions but hydrolyze in moderately acid and moderately alkaline solution, while those of type (b) are chiefly characterized in being stable in more strongly alkaline media than the soaps of type (a).

The sodium salt solution and the aluminum salt solution are prepared in the usual ways and the former is added to the slight stoichiometric excess of the latter at ordinary temperatures and with continued stirring. The aluminum soap which precipitates is filtered, washed free of salts, and placed on trays and dried at the usual low to moderate temperatures. The soaps are not usually pure in the sense of being strict chemical entities since the natural fats and oils generally used yield mixed fatty acids. They are, however, essentially homogeneous in that, throughout, the number of R groups per aluminum atom is substantially 2.0.

It appears that the markedly greater capacity of the aluminum soaps to body oils, fats and hydrocarbons is due to the "free" OH group present in those soaps. No other metallic soaps have been shown to have this group with the possible exception of gallium and indium soaps.

Evidently, the presence of this OH group is an aluminum content property, since in Al(OH)$_3$, variety Gibbsite, all the OH groups are bound, i. e., bonded to each other and incapable of forming chains with organic molecules such as are required for stiffening or bodying the latter, and soaps containing more Al than required for the formula AlOHR$_2$ are inferior gelling agents. On dispersion in an organic medium, aluminum soap molecules link with the solvent to swell them and then the linked domains cross-link with each other to gel. At the same time that the OH group permits this linking and cross-linking, it inhibits miscibility of soap and solvent so that, unlike gallium, iron and chromium soaps, aluminum soaps do not dissolve in organic or other covalent solutes without thickening them, and thus aluminum soaps have the capacity to gel combustibles for fire bombs, chloro- or fluorocarbons for pressure fire extinguishers, auto-inflammatory materials suitable for jet igniters or re-igniters for planes, rockets and guided missiles. The advantage of the homogeneous soap produced by the present method resides in that it is a more efficient bodying agent than the presently commercially available non-uniform soaps and, moreover, because of the uniformity thereof, can be used in the correct, exact calculated amounts to accomplish a given effect.

The following examples are illustrative of specific embodiments of the invention, it being understood that these examples are not limitative.

Example I

Two hundred gallons of sodium hydroxide solution (43.5° Twaddell) were gradually added with stirring to 1005 lbs. of a commercial "iso-octoic" acid in a tank provided with coils for preventing rise in the temperature above 122° F. The reaction mixture was allowed to cool until the "non-saponifiables" formed a mobile oily layer above the gelling clear soap, at which time the supernatant layer was removed using aspirator suction and a pickup glass tube. The cleaned soap was then heated to 138° F. and divided into ten equal parts by being poured into waiting tanks each containing 316 gallons of water to make a resultant 350-gallon solution containing 111 lbs. of sodium iso-octoate soap with a 50% molar excess (13.3) lbs. of sodium hydroxide in clear cold isotropic solution. Each waiting tank was used successively as follows: A stainless steel reaction tank was filled with 650 gallons of water. To this were added 350 gallons of 8.1° Twaddell filtered aluminum sulfate solution. The contents of the waiting tank were slowly added thereto with vigorous stirring. After the addition was complete, the stirring was stopped and the aluminum soap precipitate rose to float on top of the solution. It was skimmed off, using large ladles punched with drain-holes, and transferred to a wash tank in which it was agitated with 1000 gallons of water. The washed soap was then removed similarly, triturated with a small volume of water to re-wet it, re-washed and re-triturated repeatedly until free of sulfate (wash water tested with test barium chloride solution). The washed soap is seemingly water repellent and bone dry; it gives rise to airborne dust easily and seems unwettable by water but contains as much as 50% of its weight of water. It is collected in a wood frame having a coarse muslin bottom, and the frames and their contents are dried in circulating re-dried air for 30 hours at 122° F., each waiting tank batch filling one frame. The frame size is set at one cubic foot/pound of wet product. The ten batches of this example ranged from 103 to 110 lbs. dry weight. Samples from the fourth and seventh batches, on ignition analysis, showed respectively 8.14% and 8.19% Al after correction for absorbed retained salts (less than 0.3% the alumina weight). This corresponds to the formula AlOHR$_2$, i. e., the R/Al (or fatty acid anion to aluminum cation ratio, $f$ is 2.0).

Example II

Example I was repeated, using 300 gallons of sodium hydroxide solution. Each batch involved use of 550 gallons of 8.1° Twaddell aluminum sulfate solution. The soaps formed had an 8.33% Al content, i. e., R/Al (or $f$)=1.95.

Example III

A series of runs were made, as in Example I, using the acids listed in the table:

| Acid | Weight used, lbs. | Percent Al in Product Soap | $f$ |
|---|---|---|---|
| Butyric | 600 | 12.4 | 2 |
| Isobutyric | 600 | 12.3 | 2 |
| Valeric | 680 | 11.0 | 2 |
| Isovaleric | 680 | 11.0 | 2 |
| Caproic | 800 | 9.85 | 2 |
| Caprylic | 1,000 | 8.18 | 2 |
| Octoic | 1,000 | 8.16 | 2 |
| Ethyl-hexoic | 1,000 | 8.14 | 2 |
| Capric | 1,175 | 6.97 | 2 |
| Lauric + | 1,350 | 6.10 | 2 |
| Palmitic + | 1,720 | 4.86 | 2 |
| Stearic + | 1,920 | 4.42 | 2 |
| Oleic ++ | 1,920 | 4.45 | 2 |
| Linoleic ++ | 1,920 | 4.48 | 2 |
| Linolenic ++ | 1,920 | 4.51 | 2 |

NOTE.—The liquid acids were vacuum-distilled. The acids designated + were C. P., those designated ++ were purified by melting and re-setting cold.

Example IV

Example I was repeated, using commercial samples of the mixed acids shown in the table below:

| Acid | Weight used, lbs. | Percent Al in Soap | $f$ |
|---|---|---|---|
| Naphthenic I | 1,550 | 5.41 | 2 |
| Naphthenic II | 1,577 | 5.40 | 2 |
| Naphthenic III | 1,540 | 5.45 | 2 |
| Hexahydroxy benzoic | 875 | 8.95 | 2 |
| Myristic I | 1,540 | 5.40 | 2 |
| Myristic II | 1,562 | 5.40 | 2 |
| Myristic III | 1,562 | 5.36 | 2 |
| Rosin I | 2,063 | 4.18 | 2 |
| Rosin I | 2,055 | 4.20 | 2 |
| Rosin I | 2,055 | 4.17 | 2 |
| Tall oil I | 2,000 | 4.30 | 2 |
| Tall oil IV | 2,025 | 4.33 | 2 |
| Tall oil IX | 2,020 | 4.22 | 2 |

Example V

Samples of:
Beef tallow
Butter
Margarine
Chicken fat
Cocoa butter
Cottonseed oil
Cottonseed stearin
Herring oil
Lard oil
Palm fat
Peanut oil
Olive oil
Terminal Island tuna canning residue oil
Sesame oil
Blended unbodied tung oil containing some oiticia oil were separately saponfied with a 55.5% excess of soda lye or caustic potash in open pilot-plant soap kettles heated by perforated live steam coils. The hot finished contents of each kettle charge were slowly added to a 10–15% excess of 10% alum solution maintained at 105° F. and stirred turbulently. Stirring was continued for one hour after the addition had been completed. The floating precipitate, usually consisting of hard lumps, was harvested from the cold tank the following day, crushed, triturated, washed and re-rushed, re-triturated and re-washed until the washings were salt-free. The soaps had 1–3.2% extractables in cold iso-octane at 30° F. and the ash from their ignition contained from 2-4% of its weight of water-extractable adsorbate. Their % Al content was equal to an R to Al ratio of substantially 2.0 based on the saponification numbers as determined by standard alkalimetry.

*Example VI*

The reactants of Examples III and IV were used in tenth-scale repetitions of the process of Example II, only one waiting tank charge being prepared from each of the 28 acid samples. Using the added alkali, substantially homogeneous soaps were obtained having an R to Al ratio (f) of 1.8 to 1.97, the lowest R to Al ratio being obtained with the lower branched and straight chain acids, and the highest ratio being obtained with straight chain saturated acids. Soaps having an R to Al ratio intermediate of 1.8 to 1.97 were obtained using the other acids.

*Example VII*

The process of Example V was repeated using the same 17 natural fatty materials but different excess amounts of alkali and the same proportional excesses of aluminum salt solution. Substantially homogeneous soaps having R to Al ratios of substantially 2.0 were obtained. The conditions used are shown in the tabulation below:

| Percent Excess Alkali Used | Alkali Used | Aluminum Salt used |
|---|---|---|
| 0 | KOH | Potassium alum. |
| 25 | NaOH | Sodium alum. |
| 40 | (CH$_3$)$_4$NOH | Ammonium alum. |
| 50 | NaOH | Aluminum sulfate. |
| 75 | KOH | Aluminum chloride. |
| 100 | KOH | Aluminum nitrate. |
| 150 | NaOH | Aluminum suflate. |
| 200 | NaOH | Do. |

*Example VIII*

Example I was repeated, using acids in an amount equal to 1/100 that of the amount used in Example I, the acids used being shown in the following tabulation:

| Acid | Aluminum Soap Identified | f of Vacuum Dried Soap |
|---|---|---|
| Lauroyl-sarcosinic | Lauroylsarcosinate | 2 |
| Palmitoyl-sarcosinic | Palmitoylsarcosinate | 2 |
| Stearoyl-sarcosinic | Stearoylsarcosinate | 2 |
| Cocoyl-sarcosinic | Mixed higher acylsarcosinates | 2 |
| Hydroxy-stearic | 12-hydroxy octa-decanoate | 2 |
| Ricinolenic | 12-hydroxy-9-octadecenoate | 2 |
| Behenic | Behenate | 2 |
| Alpha-licanic | 4-keto-9,11,13-octadecatrienoate | 2 |
| Pelargonic | Nonanoate | 2 |
| Arachidic | Eicosanoate | 2 |
| Vinyl-cinnamic | Vinylcinnamate | 2 |
| Stearolic | Stearolate and Tarirate | 2 |
| Phenoxy caproic | 6-phenoxy-n-caproate | 2 |
| Levulinic | Gamma-ketovaleric | 2 |
| Benzoyl valeric | Delta-benzoylvalerate | 2 |

Aluminum sulfate was used as the aluminum salt in the foregoing examples. Other salts of aluminum conventionally used in making aluminum soap, such as the chloride for instance, may be used in the practice of this invention.

The homogeneous soaps, after being washed free of salts, are difficult to wet and, on drying and grinding, become almost hydrophobic, forming monomolecular films on water. The surface properties of the soaps render them useful as film-forming agents while the bulk thereof renders the films useful for cravenetting fabrics and for soak-proofing building materials. At the same time, the OH group imparts sufficient hydrophilic property to the soaps to adapt them to use as pigment wetters and contact agents for oleaginous printing inks to be applied to paper and wood. These aluminum soaps may be put to the myriad uses of the known aluminum soaps and have, for each of those uses, the distinct advantages mentioned heretofore and conferred on them by their uniformity of composition.

Since some variations and changes may be made in practicing the invention as described herein without departing from the spirit and scope thereof, it is to be understood that the invention is not to be limited except as defined in the appended claims.

What is claimed is:

1. The method of making aluminum soaps which comprises the step of adding an aqueous sodium soap solution to a 2–10% stoichiometric excess of an aqueous solution of an aluminum salt, with continued stirring.

2. The method of making aluminum soaps which comprises adding an aqueous sodium soap solution to a 2–10% stoichiometric excess of an aqueous solution of an aluminum salt with continued stirring, separating the aluminum soap which precipitates, washing said aluminum soap to remove salts therefrom, and drying said soap.

3. The method of making aluminum soaps which comprises adding an aqueous solution of the sodium salt of a substance selected from the group consisting of organic acids capable of forming an aluminum soap, the substituted acids, and functional derivatives of the acids, to a 2–10% stoichiometric excess of an aqueous solution of an aluminum salt, separating the aluminum soap which precipitates, washing said aluminum soap to remove salts therefrom, and drying the soap.

4. The method of making aluminum soaps which comprises adding an aqueous solution of the sodium salt of a substance selected from the group consisting of organic acids of $$HC_nH_{2(n-p)-1}O_2$$

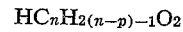

in which $n$ is the number of carbon atoms per molecule of the acid and $p$ is the number of electron pairs contributed by the carbon atoms to forming unsaturated linkages therebetween or forming rings; the substituted acids; and functional derivatives of the acids, to a 2–10% stoichiometric excess of an aqueous solution of an aluminum salt, separating the aluminum soap which precipitates, washing said aluminum soap to remove salts therefrom, and drying the soap.

5. The method of making an aluminum soap which comprises adding an aqueous solution of the sodium salt of butyric acid to a 2–10% stoichiometric excess of an aqueous solution of an aluminum salt, separating the aluminum soap which precipitates, washing said aluminum soap to remove salt therefrom, and drying said soap.

6. The method of making an aluminum soap which comprises adding an aqueous solution of the sodium salt of caproic acid to a 2–10% stoichiometric excess of an aqueous solution of an aluminum salt, separating the aluminum soap which precipitates, washing said aluminum soap to remove salts therefrom, and drying.

7. The method of making an aluminum soap which comprises adding an aqueous solution of the sodium salt of caprylic acid to a 2–10% stoichiometric excess of an aqueous solution of an aluminum salt, separating the aluminum soap which precipitates, washing said aluminum soap to remove salts therefrom, and drying.

8. The method of making an aluminum soap which comprises adding an aqueous solution of the sodium salt of 2-ethyl-hexanoic acid to a 2–10% stoichiometric excess of an aqueous solution of an aluminum salt, separating the aluminum soap which precipitates, washing said aluminum soap to remove salts therefrom, and drying.

9. The method of making an aluminum soap which comprises adding an aqueous solution of the sodium salt of 3-ethyl-heptanoic acid to an 2–10% stoichiometric excess of an aqueous solution of an aluminum salt, separating the aluminum soap which precipitates, washing said aluminum soap to remove salts therefrom, and drying.

10. The method of making an aluminum soap which comprises adding an aqueous solution of the sodium salt of lauric acid to a 2–10% stoichiometric excess of an aqueous solution of an aluminum salt, separating the aluminum soap which precipitates, washing said aluminum soap to remove salts therefrom, and drying.

11. The method of making an aluminum soap which comprises adding an aqueous solution of the sodium salt of stearic acid to a 2–10% stoichiometric excess of an aqueous solution of an aluminum salt, separating the aluminum soap which precipitates, washing said aluminum soap to remove salts therefrom, and drying.

12. The method of making an aluminum soap which comprises adding an aqueous solution of the sodium salt of palmitic acid to a 2–10% stoichiometric excess of an aqueous solution of an aluminum salt, separating the aluminum soap which precipitates, washing said aluminum soap to remove salts therefrom, and drying.

13. The method of making an aluminum soap which comprises adding an aqueous solution of the sodium salt of behenic acid to a 2–10% stoichiometric excess of an aqueous solution of an aluminum salt, separating the aluminum soap which precipitates, washing said aluminum soap to remove salts therefrom, and drying.

14. The method of making an aluminum soap which comprises adding an aqueous solution of the sodium salt of iso-octoic acid to a 2–10% stoichiometric excess of an aqueous solution of an aluminum salt, separating the aluminum soap which precipitates, washing said aluminum soap to remove salts therefrom, and drying said soap.

15. The method of making an aluminum soap which comprises adding an aqueous solution of the sodium salt of oleic acid to a 2–10% stoichiometric excess of an aqueous solution of an aluminum salt, separating the aluminum soap which precipitates, washing said aluminum soap to remove salts therefrom, and drying said soap.

16. The method of making an aluminum soap which comprises adding an aqueous solution of the sodium salt of tall oil acids to a 2–10% stoichiometric excess of an aqueous solution of an aluminum salt, separating the aluminum soap which precipitates, washing said aluminum soap to remove salts therefrom, and drying said soap.

17. The method of making an aluminum soap which comprises adding an aqueous solution of the sodium salt of rosin acids to a 2–10% stoichiometric excess of an aqueous solution of an aluminum salt, separating the aluminum soap which precipitates, washing said aluminum soap to remove salts therefrom, and drying said soap.

18. The method of making an aluminum soap which comprises adding an aqueous solution of the sodium salt of laurylsarcosinic acid to a 2–10% stoichiometric excess of an aqueous solution of an aluminum salt, separating the aluminum soap which precipitates, washing said aluminum soap to remove salts therefrom, and drying said soap.

19. The method of making an aluminum soap which comprises adding an aqueous solution of the sodium salt of hydrostearic acid to a 2–10% stoichiometric excess of an aqueous solution of an aluminum salt, separating the aluminum soap which precipitates, washing said aluminum soap to remove salts therefrom, and drying said soap.

20. The method of making aluminum soaps which comprises adding an aqueous solution of the sodium salts of acids of the formula $$HC_nH_{2(n-p)-1}O_2$$

in which $n$ is the number of carbon atoms per molecule of the acid and $p$ is the number of electron pairs contributed by the carbon atoms to forming unsaturated linkages therebetween or forming rings; the substituted acids in which the substituent is selected from the group consisting of halogen, sulfur and phosphorus; and functional derivatives of the acids, to a 2–10% stoichiometric excess of an aqueous solution of an aluminum salt, separating the aluminum soap which precipitates, washing said aluminum soap to remove salts therefrom, and drying said soap.

References Cited in the file of this patent

G. A. Parry, J. E. Roberts and A. J. Taylor, "Factors Which Affect the Gelling Characteristics of Aluminum Soaps," Proceedings of the Royal Society of London, vol. A200, pp. 148–151 (1950).

G. A. Parry and A. J. Taylor, "The Structure of Aluminum Soaps," Faraday Society Transactions, vol. 46, pp. 305–310 (1950). T. S. McRoberts and J. H. Schahman, "Role of the Hydroxyl Group in the Gelation of Aluminum Soaps in Hydrocarbons," Nature, vol. 162 pp. 101–102 (1948).